(12) United States Patent
Walker et al.

(10) Patent No.: US 8,886,440 B2
(45) Date of Patent: Nov. 11, 2014

(54) METHOD AND SYSTEM FOR REDUCING TURBO LAG IN AN ENGINE

(75) Inventors: Lee C. Walker, Swartz Creek, MI (US); B. Jerry Song, Novi, MI (US); Zhiping Steven Liu, Canton, MI (US)

(73) Assignee: GM Global Technology Operations LLC

( * ) Notice: Subject to any disclaimer, the term of this patent is extended or adjusted under 35 U.S.C. 154(b) by 1245 days.

(21) Appl. No.: 12/761,912

(22) Filed: Apr. 16, 2010

(65) Prior Publication Data

US 2011/0257867 A1    Oct. 20, 2011

(51) Int. Cl.
| F02B 3/00 | (2006.01) |
| F02D 41/40 | (2006.01) |
| F02D 41/00 | (2006.01) |
| F02D 41/10 | (2006.01) |
| F02B 39/16 | (2006.01) |

(52) U.S. Cl.
CPC ........ F02D 41/0007 (2013.01); *F02D 2250/18* (2013.01); *F02D 2250/38* (2013.01); F02D 41/405 (2013.01); *F02B 2039/168* (2013.01); *Y02T 10/144* (2013.01); *Y02T 10/44* (2013.01); *F02D 41/10* (2013.01)
USPC ............................. 701/103; 123/299; 123/564

(58) Field of Classification Search
CPC ... F02D 23/02; F02D 41/0007; F02D 41/402; F02D 41/405; F02D 2700/0287; F02D 2700/0223
USPC ......... 123/294, 299, 304, 305, 434, 672, 443, 123/478, 480, 559.1, 564; 701/103–105, 701/108, 110; 73/114.33, 114.37, 114.48, 73/114.49, 114.15
See application file for complete search history.

(56) References Cited

U.S. PATENT DOCUMENTS

| 6,095,127 | A | * | 8/2000 | Kolmanovsky et al. | ...... 123/676 |
| 6,619,033 | B2 | * | 9/2003 | Adler et al. | ...................... 60/280 |
| 6,848,414 | B2 | * | 2/2005 | West et al. | ..................... 123/299 |
| 6,959,686 | B2 | * | 11/2005 | Lee | ................................ 123/305 |
| 7,213,565 | B2 | * | 5/2007 | Grunaug et al. | ............. 123/299 |
| 7,771,313 | B2 | * | 8/2010 | Cullen et al. | .................. 477/107 |
| 8,355,858 | B2 | * | 1/2013 | Pallett et al. | .................. 701/105 |
| 8,406,983 | B2 | * | 3/2013 | Pallett et al. | .................. 701/103 |

(Continued)

FOREIGN PATENT DOCUMENTS

| CN | 101424223 | 5/2009 |
| DE | 10308789 A1 | 9/2004 |
| EP | 2264301 A1 | 12/2010 |
| WO | WO-2004076840 A1 | 9/2004 |

OTHER PUBLICATIONS

German Office Action dated May 7, 2014 from the German Patent Office for Serial. No. 10 2011 016 517.7; 5 pages.

*Primary Examiner* — Thomas Moulis
*Assistant Examiner* — Elizabeth Hadley

(57) ABSTRACT

A method and control module for controlling an engine includes a requested torque module that generates a requested torque and a turbo boost level module that determines a desired boost level based on the driver requested torque. The control module further includes a pulse determination module that determines a primary fuel injection pulsewidth and a secondary fuel injection pulsewidth based on the driver requested torque and the desired boost level and controls a first injection into the cylinder with the primary fuel injection pulsewidth and a second injection into the cylinder with the secondary fuel injection pulsewidth.

20 Claims, 4 Drawing Sheets

(56) References Cited

U.S. PATENT DOCUMENTS 8,516,799 B2 * 8/2013 Hepburn et al. ............... 60/286

2006/0107921 A1 5/2006 Grunaug et al.
2006/0207252 A1 * 9/2006 Isobe et al. ..................... 60/601
2011/0005223 A1 1/2011 Kawabe et al.

* cited by examiner

METHOD AND SYSTEM FOR REDUCING TURBO LAG IN AN ENGINE

FIELD

The present invention relates generally to internal combustion engines and, more particularly, to reduce lag from a turbocharger.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

Engine control systems have been developed to control engine torque output to achieve a desired torque. Traditional engine control systems, however, do not control the engine torque output as accurately as desired. Further, traditional engine control systems do not provide a rapid response to control signals or coordinate engine torque control among various devices that affect the engine torque output.

Turbochargers provide extra torque from the engine while allowing the overall displacement to be reduced to improve fuel economy. Moving the vehicle from zero velocity to a desired velocity is referred to as a launch. Making the launch smooth "feeling" to the driver is important. Obtaining the smooth feeling is related to the power provided by the engine. The power should rise at an acceptable rate and not overshoot and then come back down. When overshoot occurs the vehicle response is non-linear and lurches followed by lagging feeling.

If the power rises too slowly the vehicle will feel sluggish. Vehicles using a turbocharger often have a turbo lag associated therewith. Turbo lag is the time period for the turbocharger to provide the boost for the engine to begin applying the desired torque. Reducing the turbo lag time reduces the sluggish feeling of the vehicle.

SUMMARY

The present disclosure provides a system and method for reducing turbo lag by generating a secondary fuel pulse to increase the pressure or temperature or both of the exhaust gases that are used to drive the turbine of the turbocharger.

In one aspect of the disclosure, a method of controlling an engine includes generating a driver requested torque, determining a desired boost level based on the driver requested torque, determining a primary fuel injection pulsewidth and a secondary fuel injection pulsewidth based on the driver requested torque and the desired boost level, injecting fuel into the cylinder with the primary fuel injection pulsewidth and thereafter, injecting fuel using the secondary fuel injection pulsewidth.

In another aspect of the disclosure, a control module for controlling an engine includes a requested torque module that generates a requested torque and a turbo boost level module that determines a desired boost level based on the driver requested torque. The control module further includes a pulse determination module that determines a primary fuel injection pulsewidth and a secondary fuel injection pulsewidth based on the driver requested torque and the desired boost level and controls a first injection into the cylinder with the primary fuel injection pulsewidth and a second injection into the cylinder with the secondary fuel injection pulsewidth.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

Figure 1:
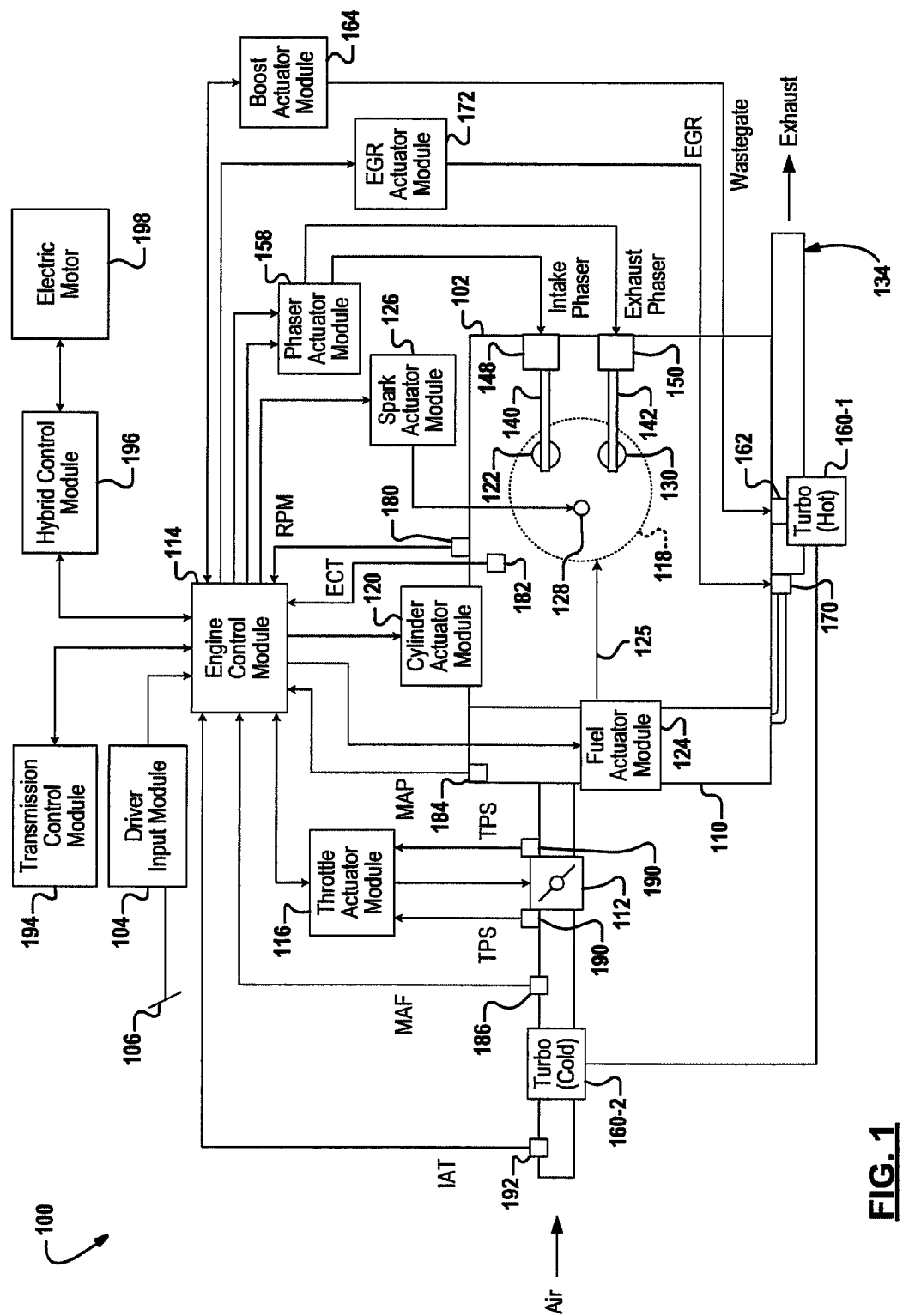
FIG. 1 is a functional block diagram of an exemplary engine system according to the principles of the present disclosure.

Further areas of applicability of the present disclosure will become apparent from the detailed description provided hereinafter. It should be understood that the detailed description and specific examples are intended for purposes of illustration only and are not intended to limit the scope of the disclosure.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an exemplary engine system 100 is presented. The engine system 100 includes an engine 102 that combusts an air/fuel mixture to produce drive torque for a vehicle based on a driver input module 104. The driver input module 104 may be in communication with an acceleration pedal sensor 106. The acceleration pedal sensor generates a signal corresponding to the amount the driver moves the acceleration pedal which corresponds to the amount of acceleration the vehicle operator desires. The sensor 106 may have an output correspond to zero all the way up to a maximum acceleration pedal signal.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

Air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The spark actuator module 126 may be controlled by a timing signal indicating how far before or after TDC the spark should be provided. Operation of the spark actuator module 126 may therefore be synchronized with crankshaft rotation. In various implementations, the spark actuator module 126 may halt provision of spark to deactivated cylinders.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate the cylinder 118 by disabling opening of the intake valve 122 and/or the exhaust valve 130.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. When implemented, variable valve lift may also be controlled by the phaser actuator module 158.

The engine system 100 may include a boost device that provides pressurized air to the intake manifold 110. For example, FIG. 1 shows a turbocharger 160 that includes a hot turbine 160-1 that is powered by hot exhaust gases flowing through the exhaust system 134. The turbocharger 160 also includes a cold air compressor 160-2, driven by the turbine 160-1, that compresses air leading into the throttle valve 112. In various implementations, a supercharger, driven by the crankshaft, may compress air from the throttle valve 112 and deliver the compressed air to the intake manifold 110.

A wastegate 162 may allow exhaust gas to bypass the turbocharger 160, thereby reducing the boost (the amount of intake air compression) of the turbocharger 160. The ECM 114 controls the turbocharger 160 via a boost actuator module 164. The boost actuator module 164 may modulate the boost of the turbocharger 160 by controlling the position of the wastegate 162. In various implementations, multiple turbochargers may be controlled by the boost actuator module 164. The turbocharger 160 may have variable geometry, which may be controlled by the boost actuator module 164.

An intercooler (not shown) may dissipate some of the compressed air charge's heat, which is generated as the air is compressed. The compressed air charge may also have absorbed heat because of the air's proximity to the exhaust system 134. Although shown separated for purposes of illustration, the turbine 160-1 and the compressor 160-2 are often attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger 160. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. The mass air flow signal can be used to obtain the air density. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the boost actuator module 164, the EGR actuator module 172, the phaser actuator module 158, the fuel actuator module 124, and the cylinder actuator module 120. For these actuators, the actuator values may correspond to boost pressure, EGR valve opening area, intake and exhaust cam phaser angles, fueling rate, and number of cylinders activated, respectively. The ECM 114 may control actuator values in order to generate a desired torque from the engine 102.

Figure 2:
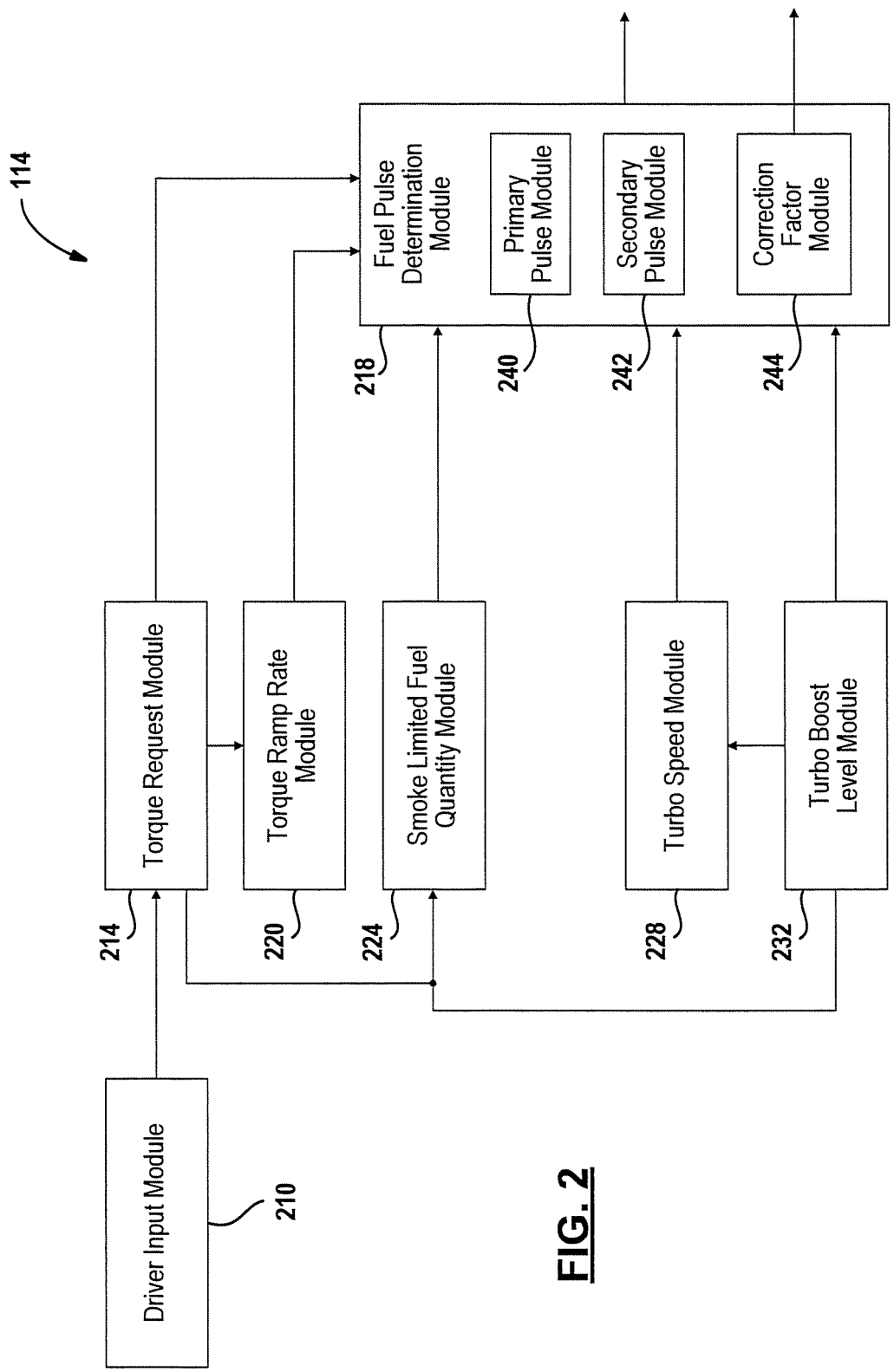
FIG. 2 is a high-level block diagrammatic view of the engine control module 114 simplified to the specifics of the present disclosure.

Referring now to FIG. 2, a functional block diagram of the engine control module 114 is illustrated. A driver input module 210 generates the driver input to the system. The driver input module 210 may base the driver input on the position of an accelerator pedal. The driver input may also be based on a cruise control, which may be an adaptive cruise control system that varies vehicle speed to maintain the pre-determined following distance. Other types of driver inputs may be generated at the driver input module.

The driver input module 210 generates a driver input signal that is communicated to a torque request module 214. The torque request module 214 may determine a torque request that is based on the driver input signal from the driver input module 210. The torque request module 214 may determine a desired torque for the current engine cycle. The torque request module 214 may generate a torque request signal that is communicated to a fuel pulse determination module 218 for determining the fuel pulsewidths to obtain the desired torque.

The torque request module 214 may also be in communication with a torque ramp rate module 220. The torque ramp rate module 220 may generate a torque request to ramp down torque to a minimum torque or engine off or ramp torque up to a desired engine torque.

The torque request module 214 may also communicate the desired torque to a smoke-limited fuel quantity module 224. The smoke-limited fuel quantity module 224 may generate a smoke-limited fuel quantity signal. The amount of fuel generated by the smoke-limited fuel quantity module may vary depending upon the engine operating conditions. For example, when the turbocharger is in operation, the smoke-limited fuel quantity may be increased. The smoke-limited fuel quantity is the amount of fuel at which point smoke is generated during the combustion process. In diesel engines, it is desired to limit the amount of smoke generated by the fuel.

A turbo speed module 228 generates a turbo speed signal and communicates the turbo speed signal to the fuel pulse determination module 218. The turbo speed module 228 may generate a desired turbo speed based on the amount of boost level from a turbo boost level module 232. The turbo boost level module 232 may receive the torque request signal from the torque request module 214 to generate the amount of turbo boost desired to attain the torque request. The turbo speed module 228 generates a desired turbo speed signals based upon the turbo boost level from the turbo boost level module 232. The turbo speed module 228 may also measure or estimate the amount of turbo speed based upon a speed sensor or a pressure sensor.

The fuel pulse determination module 218 may generate a primary fuel pulse from a primary pulse module 240 and a secondary pulse from a secondary pulse module 242. The primary pulse from the primary pulse module 240 may be at a predetermined time to generate, for example, peak torque within the cylinder. The secondary pulse from the secondary pulse module 242 may be at a second time later than the first time the secondary pulse from the secondary pulse module 242 increases the enthalpy of the exhaust gases. The exhaust temperature may be increased by the second pulse, the pressure may be increased by the second pulse, or both the pressure and the temperature may be increased by the second pulse to increase enthalpy of the exhaust gases.

A correction factor module 244 generates a correction factor used for correcting the pulsewidths for subsequent primary pulses. The correction factor module 244 may modify the primary pulse based upon various factors including the driver torque request, the smoke-limited fuel quantity and the turbo speeds and turbo speed level.

Figure 3:
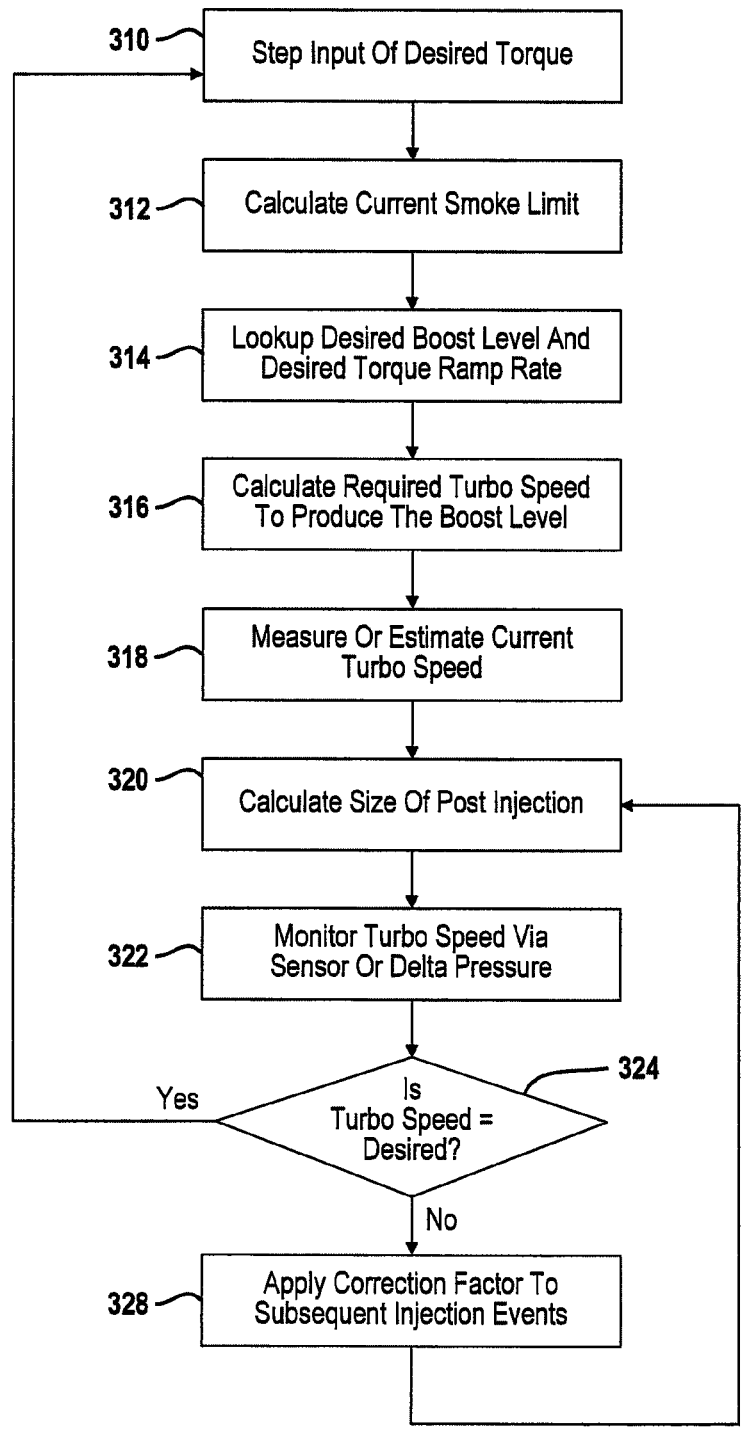
FIG. 3 is a flowchart of a method for performing the present disclosure.

Referring now to FIG. 3, a method for using a retarded injection time to reduce turbo lag is set forth. In step 310, a step input of desired driver torque is provided. The desired torque may be determined from the driver determination module 210 as described above in FIG. 2. In step 312, the current smoke limit is determined. The current smoke limit may be increased due to the increased amount of torque requested. The increased smoke limit may also correspond to the amount of fuel to be injected. As mentioned above, there is a correspondence between the amount of torque and the amount of fuel to be injected. This quantity of fuel corresponds to the smoke limit.

In step 314, the desired boost level and the desired torque ramp rate are determined based upon the desired torque. The desired boost level and the desired torque ramp rate may be calibratable during the engine development process. A look-up table may be generated during the engine development process to obtain a desired boost level and a desired torque ramp rate based upon the desired torque and the smoke limit.

In step 316, the required turbo speed to obtain the boost level is calculated based upon the desired boost level and the desired torque ramp rate in step 314. In step 318, the current turbo speed is either estimated or measured. The turbo speed may be directly measured using various types of speed sensors or pressure sensors. The turbo speed may also be estimated based upon various engine sensor outputs.

In step 320, the size of the secondary or post-injection is determined. The size of the secondary or post-injection may be based, in part, on the current turbo speed and the calculated required turbo speed to produce a boost level.

In step 322, the turbo speed is monitored by a pressure sensor or another type of sensor. In step 324, if the turbo speed is equal to the desired turbo speed, the process ends in step 326. In step 324, when the turbo speed is not equal to the desired speed, a correction factor may be generated to correct subsequent injection events. The correction factor may be used to correct the secondary injection event or the primary injection event. After step 328, step 320 is again performed. As can be seen, the process continually updates so that a desired turbo speed is obtained. Vehicle response to the fuel injected may be increased or reduced using the correction factor.

The calibration table entries described above may allow entry of the immediate torque ramp over several cylinder firing events as a percentage of the final torque target increase.

By adjusting the amount of and the timing of the secondary pulsewidth, the amount of turbo lag can be reduced. The amount of turbo torque may be varied based upon the pressure and the temperature of the exhaust gases.

Figure 4:
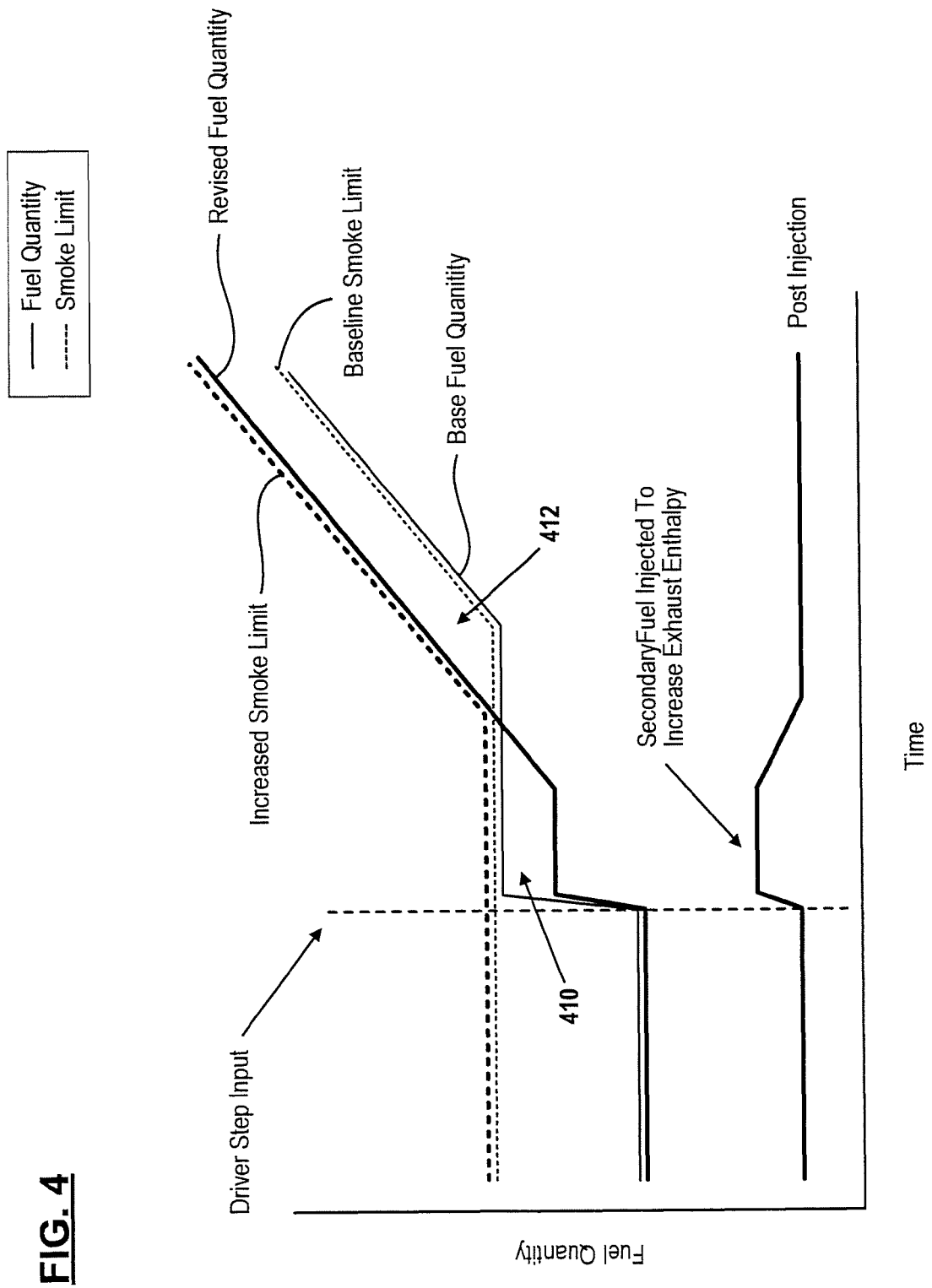
FIG. 4 is a plot of fuel quantity versus time for engine control signals.

Referring now to FIG. 4, a base fuel quantity is illustrated relative to a revised fuel quantity. The base fuel quantity does not take into consideration the secondary injection as described above in the disclosure. The revised fuel quantity takes into consideration the secondary injection quantity that is injected at a time later than the first fuel quantity. As can be seen, the total amount of fuel quantity generally coincides with the base fuel quantity; however, in the region 410, the revised fuel quantity is less than the base fuel quantity. The secondary pulsewidth represented by the secondary fuel amount is injected to increase exhaust enthalpy changes and increases the overall fuel quantity from the primary fuel quantity.

The revised fuel quantity rate increases at a rate corresponding to a torque ramp. The baseline smoke limit is increased as well. The increased smoke limit is increased to follow the fuel quantity from the amount of torque desired to be generated. The additional fuel quantity is increased at the region corresponding to the driver step input. Of course, the timing of the secondary fuel pulse injected may be changed.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of controlling an engine comprising:
generating a driver requested torque;
determining a desired boost level based on the driver requested torque;
determining a primary fuel injection pulsewidth and a secondary fuel injection pulsewidth based on the driver requested torque and the desired boost level;
injecting fuel into a cylinder with the primary fuel injection pulsewidth; and
thereafter, injecting fuel using the secondary fuel injection pulsewidth.

2. A method as recited in claim 1 further comprising determining a desired torque adjustment rate based on the driver requested torque.

3. A method as recited in claim 1 wherein injecting fuel using the primary fuel injection pulsewidth is generated to attain a peak torque.

4. A method as recited in claim 1 further comprising determining a desired turbo speed based on the desired boost level.

5. A method as recited in claim 4 further comprising determining current turbo speed.

6. A method as recited in claim 5 further comprising determining a total fuel quantity.

7. A method as recited in claim 6 further comprising determining the primary fuel injection pulsewidth and the secondary fuel injection pulsewidth based on the total fuel quantity, the current turbo speed and the desired turbo speed.

8. A method as recited in claim 6 further comprising determining a fuel smoke limit.

9. A method as recited in claim 8 further comprising determining the total fuel quantity based on the smoke limit.

10. A method as recited in claim 8 further comprising determining the fuel smoke limit based on the driver requested torque.

11. A method as recited in claim 8 further comprising increasing the smoke limit when a turbo speed increases.

12. A method as recited in claim 1 further comprising increasing enthalpy of exhaust gasses in response to injecting fuel using the secondary fuel injection pulsewidth.

13. A method as recited in claim 12 wherein increasing enthalpy comprises injecting fuel using an increasing exhaust pressure.

14. A method as recited in claim 12 wherein increasing enthalpy comprises increasing exhaust temperature.

15. A method as recited in claim 12 wherein increasing enthalpy comprises increasing exhaust temperature and pressure.

16. A control module comprising:
a requested torque module that generates a driver requested torque;
a turbo boost level module that determines a desired boost level based on the driver requested torque; and
a pulse determination module that determines a primary fuel injection pulsewidth and a secondary fuel injection pulsewidth based on the driver requested torque and the desired boost level and that controls a first injection into a cylinder with the primary fuel injection pulsewidth and a second injection into the cylinder with the secondary fuel injection pulsewidth.

17. A control module as recited in claim 16 wherein the requested torque module determines a desired torque adjustment rate based on the driver requested torque.

18. A control module as recited in claim 16 further comprising a turbo speed module that determines a desired turbo speed based on the desired boost level and a current turbo speed and wherein the pulse determination module determines the primary fuel injection pulsewidth and the secondary fuel injection pulsewidth based on the driver requested torque, the desired boost level, the desired turbo speed and the current turbo speed.

19. A control module as recited in claim 16 further comprising a smoke limited fuel quantity module that determines a smoke limited fuel quantity and wherein the pulse determination module determines the primary fuel injection pulsewidth and the secondary fuel injection pulsewidth based on the driver requested torque and the smoke limited fuel quantity.

20. A control module as recited in claim 16 wherein the pulse determination module increases enthalpy of exhaust gasses using the secondary fuel injection pulsewidth.

* * * * *